United States Patent [19]

Carstensen

[11] Patent Number: 4,573,359
[45] Date of Patent: Mar. 4, 1986

[54] SYSTEM AND METHOD FOR ASSURING INTEGRITY OF TUBULAR SECTIONS

[76] Inventor: Kenneth J. Carstensen, 2901 Laurel, Odessa, Tex. 79762

[21] Appl. No.: 165,246

[22] Filed: Jul. 2, 1980

[51] Int. Cl.$^4$ .............................................. G01L 1/22
[52] U.S. Cl. ......................................... 73/761; 33/179
[58] Field of Search ................ 73/761, 862.63; 33/179

[56] References Cited

U.S. PATENT DOCUMENTS

| | | | |
|---|---|---|---|
| 1,889,089 | 11/1932 | De Giers | 33/179 |
| 2,637,907 | 5/1953 | Aubrey et al. | 33/179 |
| 3,082,621 | 3/1963 | Söderholm | 73/855 |
| 3,314,156 | 4/1967 | Burkleo | 33/179 |

Primary Examiner—Anthony V. Ciarlante

[57] ABSTRACT

In the joinder of successive sections of pipe or casing, as in oil well applications, the quality of the joinder during makeup is measured by sensing actual bearing pressure. A deformation resistant member such as a chain having solely point contact engagement with the pipe collar includes a short sensor section deformable within its yield limits and is wrapped about the collar in the mid-region of its threaded portion. As the pipe is threaded into the collar, bearing forces exerted on the collar are measured by strain gauges in terms of the extension of the sensor section. The non-yielding character of the chain and its transverse span provide both an integration of the circumferential deformation within the band of interest and a substantial mechanical gain at the sensor section. Temperature sensors responsive to the temperatures of the collar, pipe and deformable section generate signals for circuits that are used to compensate for thermal effects, so that accurate readings are obtained under field conditions.

31 Claims, 15 Drawing Figures

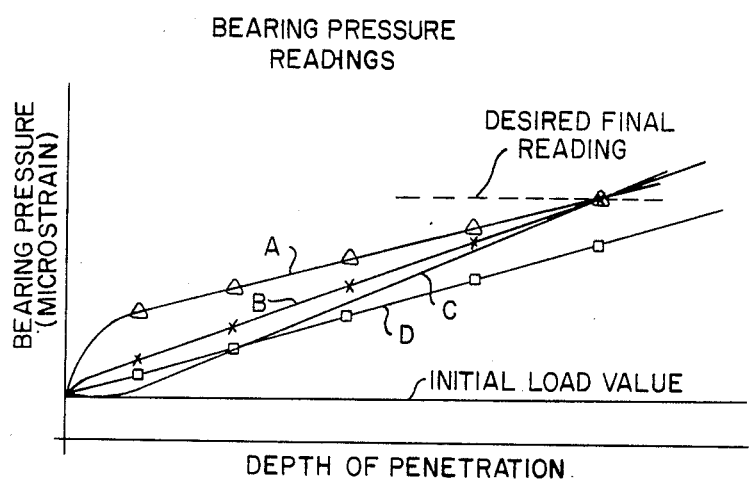
FIG.5
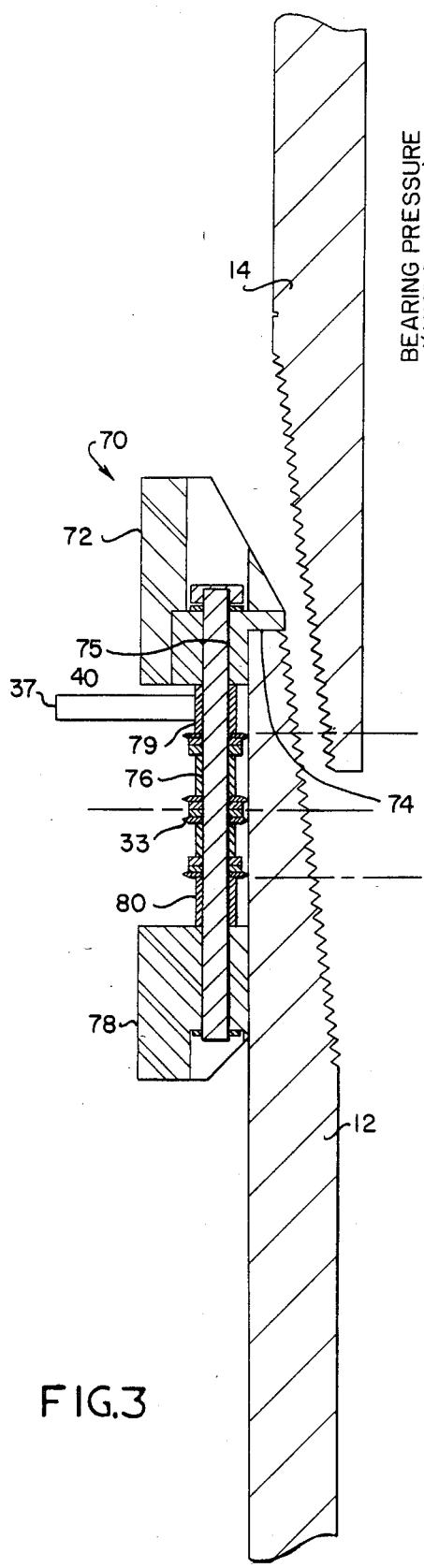
FIG.3
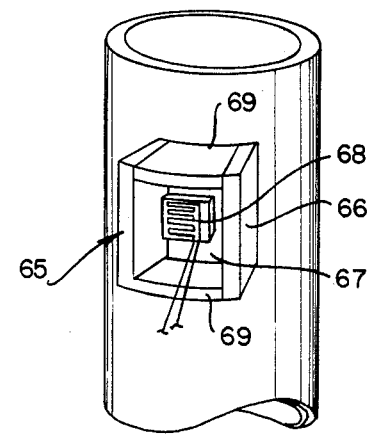
FIG.15
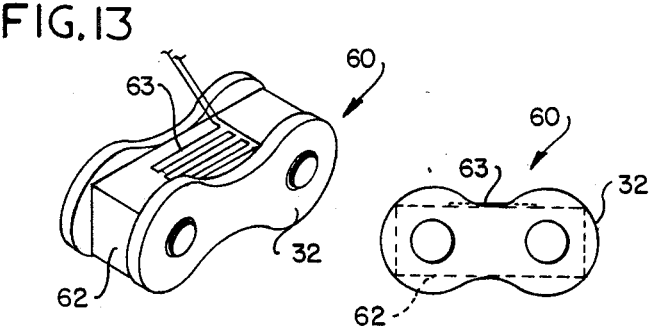
FIG.13
FIG.14

SYSTEM AND METHOD FOR ASSURING INTEGRITY OF TUBULAR SECTIONS

BACKGROUND OF THE INVENTION

In the serial joinder of tubular sections into long strings, it is often required to assure that there is both adequate mechanical strength and a leak-free seal in each joinder region. A significant example of this situation is found in the handling of pipe and casing strings under the demanding conditions encountered in present day oil well drilling. It is now common practice to drill to depths of more than 20,000 feet, which in turn requires that the successive couplings be capable of withstanding not only significant pressure differentials, but also extremely high forces along the longitudinal axis. The couplings must also be leak free under the conditions to be encountered, and couplings which do not respond correctly when made up must be replaced before the operation recommences.

Drill pipe and casings are of course fabricated with these practical requirements in mind, and different grades and weights of tubing may be used at different regions along the length of a string, with the tubing diameter usually, but not necessarily, remaining the same. Under presently used standards, each section of tubing has a male thread of specified length, taper and pitch at each end, to be received within a mating sleeve or collar having complementary female threads. The collar is sometimes referred to as the "box" or coupling and the pipe end is then referred to as the "pin". The nominal depth of insertion of the pin within the box can roughly be defined by reference to a "last scratch" mark that theoretically is the terminus of the thread on the pin. Manufacturing tolerances for the tubular sections and the collars are set by the American Petroleum Institute (API), which also has established the tolerances for the threads and the position of the last scratch (typically plus or minus two pitches). Pipe and casings are sufficiently expensive at the present time to make it economically impractical to place stricter tolerances than those presently observed with existing grades.

In making up a pipe string, a drilling crew must operate at maximum reasonable speed, sometimes being required constantly to exceed a certain minimum rate in order to maintain drilling mixture in the well bore. Individual pipe lengths are taken from a supply, usually with collars attached, and the pin end of the next succeeding section is threaded by a power tongs into the upstanding collar of the next previously attached section. An early technique was to rotate the pin a specific number of turns after a "handtight plane" engagement, while also checking the placement of the last scratch. This was an indirect method of trying to ascertain that a leak free coupling existed, and became clearly inadequate as drill string lengths and system operating pressures increased. Diameters, thread pitches, tapers and profiles of mating sections may be at opposite ends of the allowable tolerance ranges. Also, the amount of wear of the pin and box, the presence of foreign matter, the existence of damaged threads and other imperfections can greatly affect both the position of the handtight plane and quality of the coupling resulting after a number of turns are taken.

Other indirect measurement techniques, often based on measurement of torque, have long been attempted and in some cases used. None has proven to be satisfactory or practical for modern conditions, however, because both more precision and more positive assurance of a leak free seal are demanded. Workers in various arts have long used circumferential belt devices to attempt to measure the expansion of a cylindrical member. Engineering studies have also shown the resultant effect on a tubular collar of an internal force, such as an advancing threaded member.

As far as is known, only one attempt has been made to provide an essentially direct measurement of the expansion of a tubular collar for the purpose of assembling successive sections of tubular goods with leak free joinders. This approach is disclosed in U.S. Pat. No. 3,314,156 to Van Burkleo, who proposes the application of a bipartite flat band member that encircles a collar at some not precisely defined region between the ends of the collar, and is tightened to a starting condition. The relative position between a ferrite core on one part of the bipartite band and a coil on the other part of the band varies as the collar is deformed circumferentially when the mating threaded members are tightened together. Van Burkleo proposes usage of this variable reactance device to control the output frequency of a variable frequency oscillator which in turn control an indicating meter, either directly or by means of a remote transmission link. While the Van Burkleo device represents a creditable attempt to bypass indirect measurement techniques, it has never been commercially used although developed by a large industrial organization.

In the light of the present invention, the reasons for its impracticality are now understood, and derive from complexities that were not confronted by Van Burkleo. Van Burkleo proposed the use of an essentially flat strap and did not specify the circumference at which it was to be placed. Eccentricities in the members and foreign matter could thus affect the readings, which (it is now known) are widely variable where there is a substantial differential in the wall thicknesses of the threaded sections as they wedge together. Conversion of the true circumferential deformation to an electrical signal that is linear and repeatable is a considerable problem in both mechanical and electrical terms. The displacement may be very small even though the forces involved are large. Moreover, both long term and short term thermal effects can introduce major errors. For example, rapid tightening of the pin in the collar heats the collar significantly, while a less rapid tightening results in a lower temperature rise. Because temperature changes introduce high force variations, they can introduce substantial errors in taking readings of bearing pressure. Other temperature differences, both relatively stable and changeable, may also exist between the tubular sections and the sensor and affect the readings. Past systems, such as the Van Burkleo system, which did not recognize or take account of these factors, could not provide a reasonable expectation of providing useful output readings.

Since the Van Burkleo work, therefore, numerous attempts have been made by his organization and others to provide useful readings by less direct methods. In some systems, exemplified by U.S. Pat. Nos. 3,368,396, 3,606,664 and 3,745,820, torque measurement is combined with a measurement of the number of turns used in making the coupling. These techniques are not known to have been used in practice, at least partly because of the unreliability of the readings, but also because they slow down the drilling operations. It should be noted that measurement of applied forces in threaded couplings has been used in other contexts, as exemplified by U.S. Pat. Nos. 2,998,585, 3,541,844 and 3,872,719. In these systems a member is disposed within a load bearing structure to provide a locus for a strain gauge measurement of forces applied along the longitudinal axis, but this is neither directly applicable to nor economically useful in the handling of tubular products in a well drilling context. A number of laboratory examinations of stress conditions in cylindrical structures have been undertaken, as evidenced by an article by A. B. Potvin et al entitled "Stress Concentration in Tubular Joints", published in the Society of Petroleum Engineers Journal, pp. 287–299, Aug. 1977, and an article entitled "On The Use of Foil Strain Gauges to Measure Internal Strains of Thick Walled Cylinders" by R. V. Milligan, published in the ISA Transactions, Vol. 15, No. 1, pp. 95–99 (1976). The strain gauge techniques mentioned in these articles require careful preparation of the surface, alignment of the strain gauge and other precise adjustments, and even then merely provide a localized indication of the stress in the immediate region about the transducer.

It remains highly desirable, therefore, to provide a reliable, field usable, system for directly measuring the physical properties of a threaded joint to assure that it is both structurally sound and leak free, which system is independent of the variables and operative problems that can be encountered in practical applications, and functions in such manner as not to delay field operations.

SUMMARY OF THE INVENTION

Systems and methods in accordance with the invention physically encompass the circumference of a tubular section, within the longitudinal span of a threaded portion, by a separable load resisting member having a sensor section. In a particularly advantageous form the encompassing member engages the tubular section only with point contact, conforms to the periphery of the tubular section, and has a relatively short serially coupled deformable sensor section operable within its elastic limits. As interior forces on the threaded portion seek to expand the tubular section, as when a mating member is threaded in, bearing forces exerted on the outer tubular member are measured in terms of the extension of the deformable section. Strain sensing elements secured to the deformable section are advantageously used for this purpose. The non-yielding character of the major portion of the sensor member and its transverse span provide both an averaging or integration of the circumferential deformation within the band of interest and a substantial mechanical gain at the deformable section. Temperature sensors responsive to the temperatures of the collar, pipe and deformable section generate signals for circuits that are used to compensate for thermal effects. Mechanisms and methods in accordance with the invention are quickly and readily utilized even under difficult conditions to provide accurate, repeatable readings that are directly representative of actual bearing pressure.

Further in accordance with the invention, a detachable chain link member is looped about a pipe section concentric with the longitudinal axis of the pipe. Strain sensors disposed on the surface of the deformable element are arranged in a bridge network to provide electrical signal variations responsive to both longitudinal extension and transverse compression as pipe sections are coupled together. Temperature sensors coupled to the chain link member and in separate operative relation to the collar and pipe provide signals that are summed in appropriate compensatory senses with the bridge output to take ambient pipe temperatures and temperature differentials into account. The chain link member is preloaded to a selected initial tension level as indicated by the compensated signal to eliminate the effects of pipe irregularities and foreign matter, taking temperature differentials into account. The area of contact between the chain and the pipe is limited by assuring that only point contacts exist, so that direct metal-to-metal contact is assured on pre-loading, and this further limits thermal conduction between the elements. The hoop deformation of the collar as the pipe sections are threaded together then causes a proportional elongation of the deformable section, giving strain readings that have both high linearity and resolution. The temperature compensation circuits also vary the output reading to adjust for friction-generated changes in temperature. The pipe makeup operation is stopped when the final bearing pressure reading is within a particular range, determined by theoretical or empirical analysis for different pipe sizes and operative conditions.

A specific example of a sensor system for a drill rig application incorporates a double row chain link member having an adjustable scissors-type coupling for pretensioning adjustment. An annular positioning mechanism is coupled to the chain member and seats on the end of a pipe collar, so as to serve as a guide for the pipe stabbing operation and also precisely position the chain system relative to the threaded portion of the pipe collar. Hardened washers having sharpened edges are disposed within the chain link couplings to register against the pipe with the desired point contact. The chain is mounted to be centered about and to span and encompass a circumferential band within the pipe thread section at which the ratio between the collar wall thickness and the wall thickness of the pin when engaged is approximately unity. In accordance with the invention the deformable element is advantageously formed as a removable coupling in the chain and has a narrowed mid region proportioned such that surface strains vary linearly with extension. In a specific example orthogonally disposed strain gauge pairs are attached to opposite sides of the deformable element to provide complementary pairs of tension and compression readings. The strain gauge elements are interconnected as separate arms in the bridge circuit and the output signal derived from the bridge may thereafter be processed by analog or digital techniques. Separate bridge circuits incorporating the temperature sensors for the pipe, collar and deformable element develop corrective signal components accounting for frictional heating of the collar, conductive heating of the chain link and ambient temperature variations of the pipe. In an analog system these corrective signals are generated in bridge circuits coupled in parallel with the strain gauge bridge. If the mating members are impermissibly out of tolerance the "last scratch" reference mark on the pipe can remain too far outside or extend too far within the collar. However, with both the readings obtained and this visual check, a drilling supervisor can judge whether the pipe should be replaced or whether the coupling is satisfactory. In accordance with the invention, optimum bearing pressure values are computed for each grade and weight of pipe, and bearing pressure readings can be compared to the appropriate values as pipes are changed.

A feature of systems in accordance with the invention utilizes a guide and positioning structure including a diverging throat portion seatable on the end of a collar to guide and buffer the pipe end being received within the collar. Precisely adjustable positioning pins depending from the guide portion support the encompassing chain mechanism at a given axial position and with accurate concentricity about the central axis of the collar. This mechanism can quickly be placed on and removed from a collar, provides protection of the strain sensing element, and registers the sensing structure in the location desired. The entire operation of attachment, preloading and sensing can be accomplished so rapidly that there is no slowing of normal pipe makeup operations. Successive bearing pressure readings can also be automatically recorded to provide a constant and permanent record.

Systems and methods in accordance with the invention may also utilize a "floating collar" variation in which the collar is not secured against rotation or pretightened on the lower pipe section, so that turning of the upper pipe section engages both threads simultaneously. In this arrangement, bearing pressure sensors are disposed about the collar at each separate end of the pipe, and means are provided for transfer of the electrical signals from the rotating collar to the external instrumentation. A small transmitter mounted on the collar is conveniently employed for this purpose, although slip rings and brushes may alternatively be utilized.

BRIEF DESCRIPTION OF THE DRAWINGS

A better understanding of the invention may be had by reference to the following description, taken in conjunction with the accompanying drawings, in which:

FIG. 3 is a side sectional view of a part of the system shown in FIG. 2, showing the physical disposition of the sensor device relative to mating threaded portions of cylindrical sections;

FIG. 5 is a graphical representation of typical bearing pressure variations during operation of systems in accordance with the invention;

FIG. 13 is a perspective view of a chain temperature sensor that may be employed in the arrangement of FIGS. 1-4;

FIG. 14 is a side view of the sensor of FIG. 13; and

FIG. 15 is a perspective view, partially broken away, of a removable pipe temperature sensor that may be employed in the arrangement of FIGS. 1-4.

DETAILED DESCRIPTION OF THE INVENTION

Figure 1:
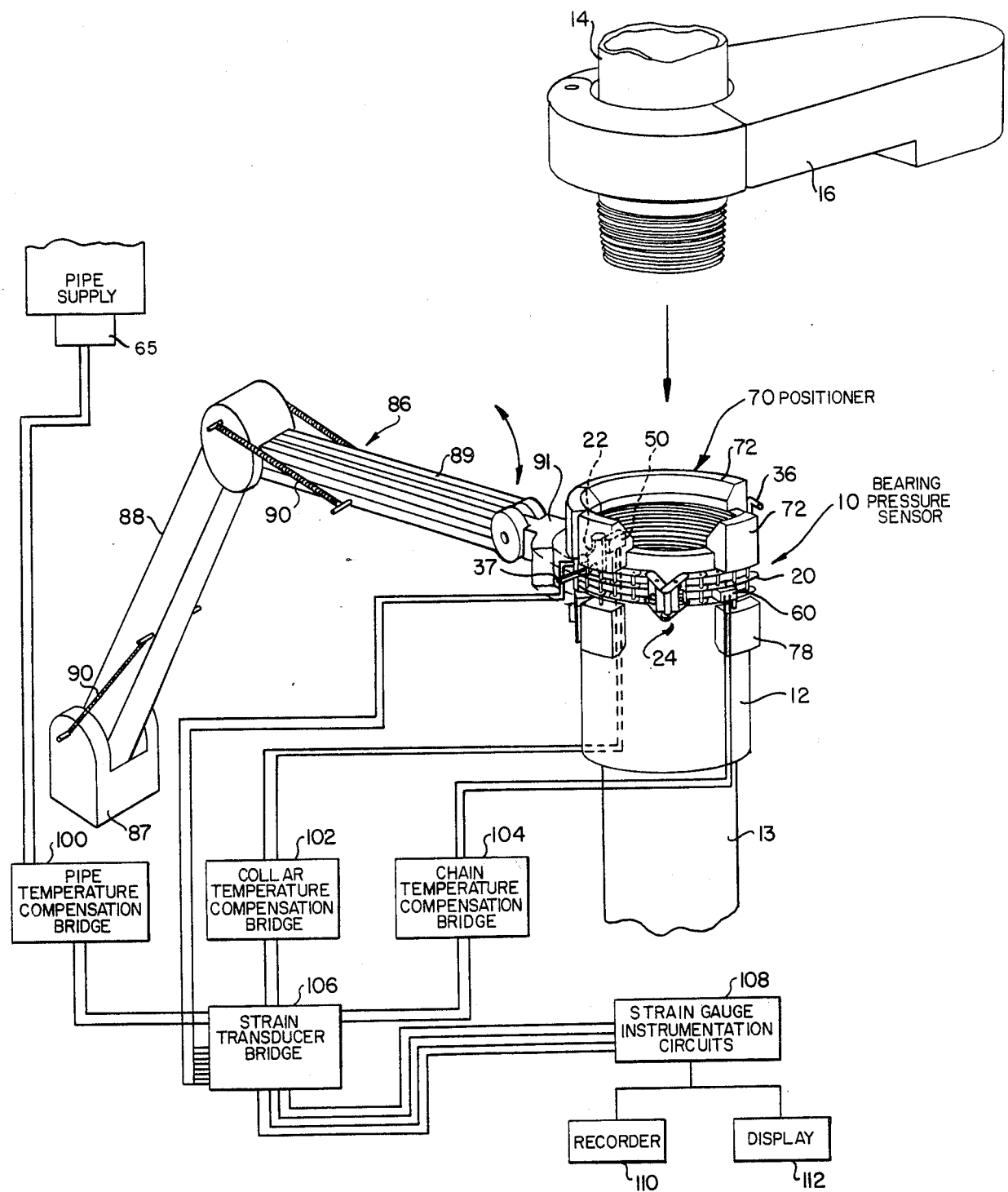
FIG. 1 is a combined block diagram and perspective view, partially broken away, of a bearing pressure sensor system in accordance with the invention.

FIGS. 1-4 depict a system in use at a drilling site for assuring leak-free joints with proper mechanical coupling between successive tubular or pipe sections, such as casings, that are being sequentially threaded together at the drill site. An external structure, herein referred to as a bearing pressure sensor 10, is mounted to encompass a collar 12 directly about the mid-region in the threaded segment of the collar 12. In the drill string, the collar 12 intercouples a lower pipe section 13 that protrudes from the drill string and is held relatively fixed during makeup to an upper pipe section or pin 14 that is lowered onto the collar 12 by the drilling crew and rotated into engagement by a power tongs 16 that is depicted only generally. In the usual drilling sequence, the lower pipe section 13 and collar 12 are preassembled, and held fixed while the power tongs 16 engages and rotates the upper pipe section 14 into proper threaded relationship relative to the collar 12. The male threaded end of the upper pipe section 14 is received within the female threaded end of the receiving collar 12 (the "box"). As previously mentioned, for each grade and weight of pipe the API specifies a predetermined taper and thread pitch, the location of the "last scratch" mark, and the other permissible tolerances. In accordance with the present invention, the net (differential) circumferential or hoop deformation of the collar 12 that occurs in the approximate mid-region of the thread is sensed by the exterior bearing pressure sensor 10.

In this example the sensor 10 includes a double row chain 20 of high strength and high Youngy's modulus, such as hardened steel, and a lower strength and more readily deformable element 22 of smaller cross-sectional area and less force resistant material, such as aluminum. The deformable element may be said to have a dogbone shape including larger ends coupled into the chain and a waist section 23 that is of smaller and substantially uniform cross section in its intermediate region, and symmetrically disposed about the center line of the chain 20. A strain gauge assembly, described hereafter, is mounted on this waist section 23 to provide an accurate measure of the extent of deformation of the element 22. Other sensing means, such as displacement or force transucers, may be used, but the resolution, repeatability and linearity required place stringent demands on the system and such devices cannot merely be substituted.

Figure 7:
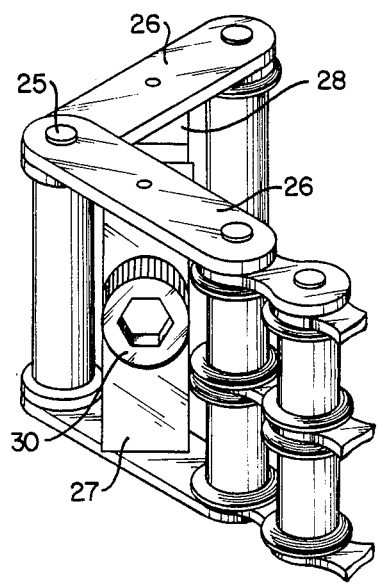
FIG. 7 is a fragmentary perspective view of a pretensioning device employed in the system of FIGS. 1-4.

At a spaced apart region of the chain 20 from the deformable element 22, two portions of the chain are joined by an adjustable scissors mechanism 24 (also seen in FIGS. 4 and 7) having a pair of arm sections 26 coupled together by a pivot pin 25. The end of each arm section 26 opposite from the pivot pin 25 is coupled to a different spaced apart end of the double row chain 20, and the separate halves 27, 28 of a split block are attached to the individual arm sections 26. An adjustment screw 29 fitting through the split block halves 27, 28 may be turned by a manually rotatable handle 30 (best seen in FIG. 4) to close or open the split block halves 27, 28, thereby closing or opening the scissors mechanism 24, so as to establish a preload tension level on the chain 20.

Figure 2:
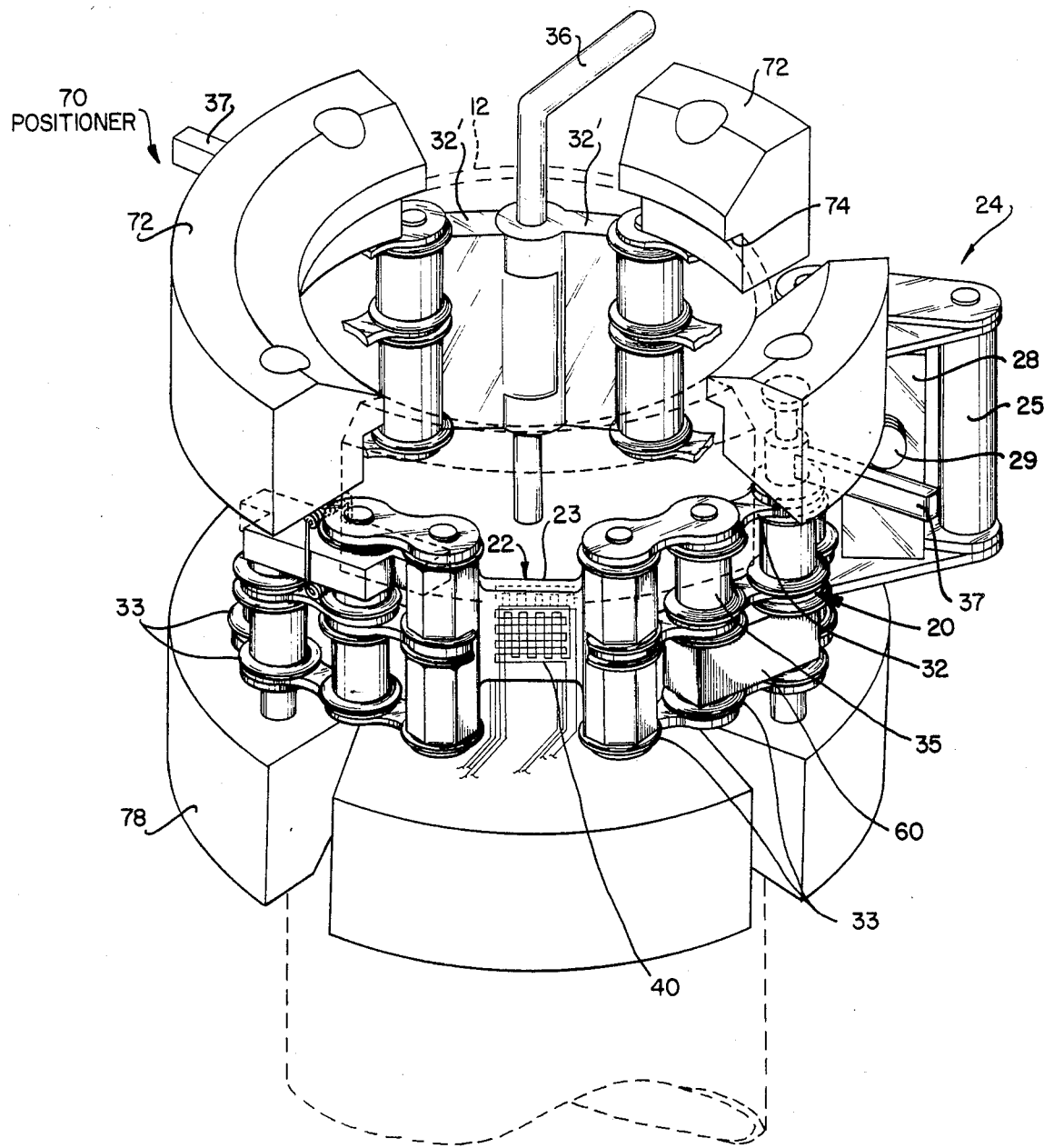
FIG. 2 is a perspective view, partially broken away, of the portion of the system of FIG. 1 that is mounted on a pipe collar, showing further details thereof.
Figure 4:
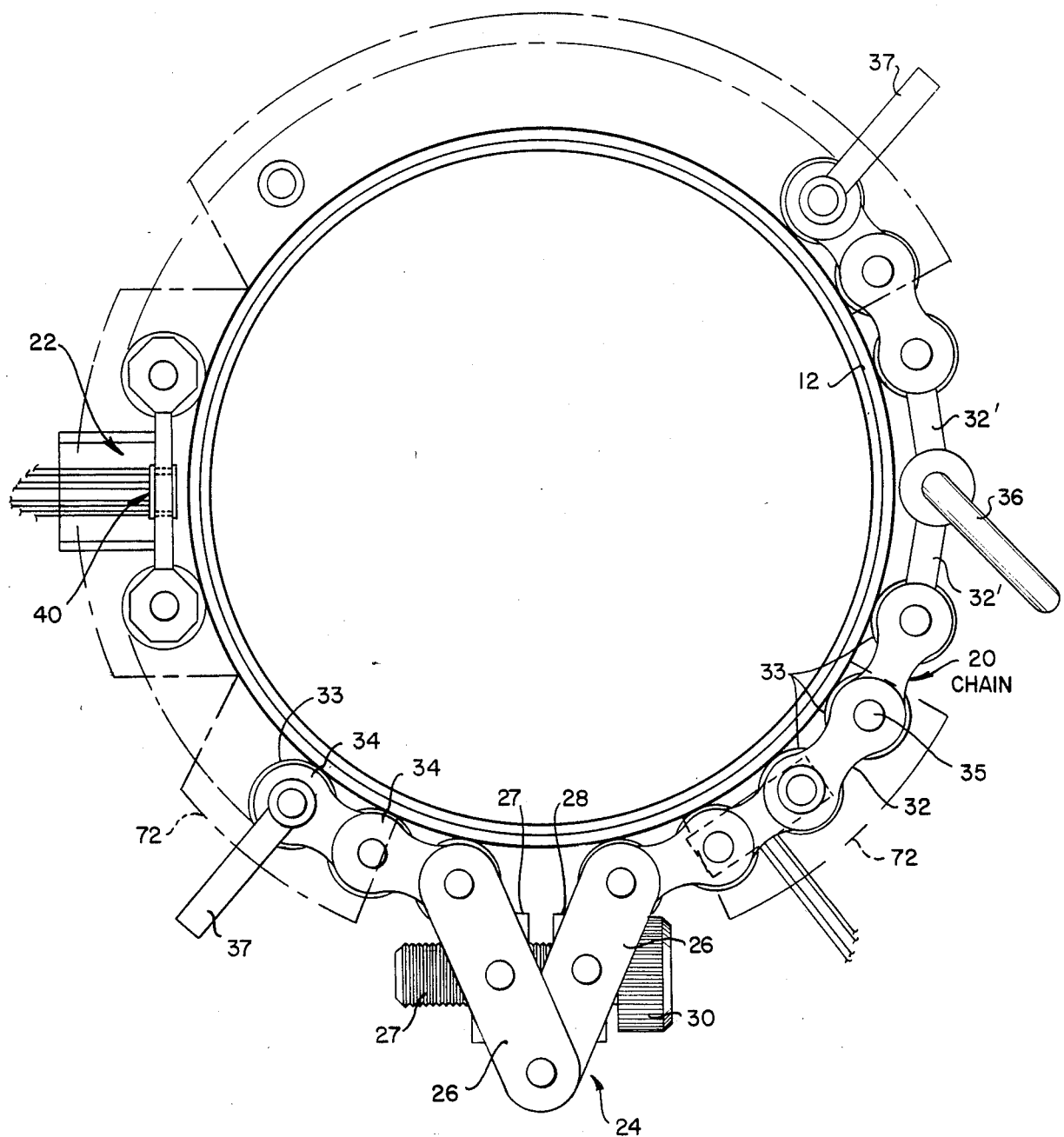
FIG. 4 is a plan view of a portion of the arrangement of FIGS. 1 and 2, showing further details thereof.

As best seen in FIGS. 2 and 4, sections of the chain 20 are united in conventional fashion, with the chain links 32 having generally annular ends 34 within which are registered the transverse pins 35 which complete the chain. Hardened washers 33 having sharpened edges are positioned along the pins 35, between the link ends 34 and the adjacent portion of the associated pins 35, to engage the facing surface of the oppositely curving collar 12. Thus only multiple point contacts exist when the bearing pressure sensor 10 is wrapped about the collar 12. If washers are not to be used, portions of the facing ends 34 of the links 32 can be ground or machined away to provide point contact. At one region on the circumference of the chain, the chain 20 is coupled together by a removable quick release pin 36 fitting within two specially shaped links 32' in the chain (FIGS. 2 and 4). Withdrawal or insertion of the quick release pin 36 through matching sleeves in the chain links 32' is easily accomplished with tension slightly released. Thus the chain 20 can readily be removed from or attached to the collar 12. The edges of the washers 33 seat provide metal-to-metal engagement with the collar 12 when the chain is tensioned, because the contact points cut through rust and other foreign surface matter, and the chain also conforms to any peripheral collar eccentricity. At substantially opposite points about the periphery of the chain 20, attachment pins 37 are mounted on removable pins described below to extend radially outwardly so as to permit the weight of the chain and the associated mechanism to be carried on an associated support mechanism described hereinafter.

Figure 6:
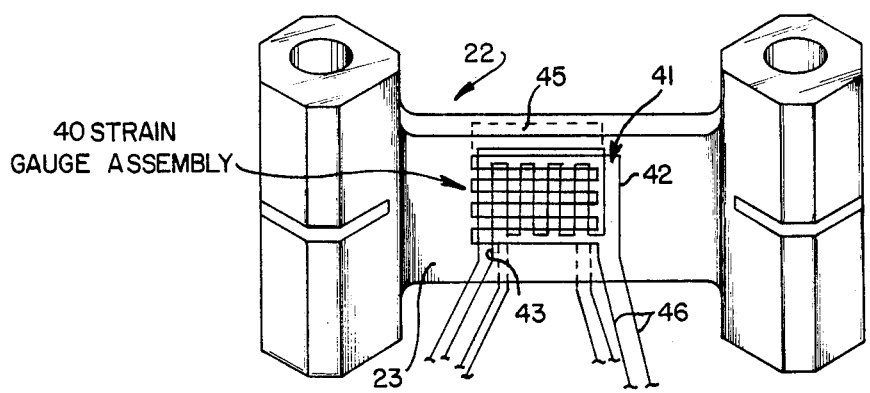
FIG. 6 is a perspective view, partially in phantom, of a deformable element with two sets of orthogonally disposed strain gauges thereon.

A strain gauge assembly 40 is precisely attached to the waist section 23 of the deformable element 22 along its longitudinal center line. Flat, polished surfaces may be prepared on the deformable element for receiving the strain gauge assembly 40, in order to minimize the drift and zero setting problems that typically are encountered with strain gauges. Referring now also to FIG. 6, a first orthogonal transducer pair 41 is disposed on one face of the deformable element 22, arranged in what is sometimes referred to as a rosette configuration, with a tension strain gauge element 42 being disposed to sense extension along the longitudinal axis, and with an orthogonally disposed compression strain gauge element 43 being responsive to the lateral compression that occurs in accordance with Poisson's ratio. Referring to the surface of the deformable element 22 to which the first orthogonal transducer pair 41 is attached as the front surface, a second orthogonal transducer pair 45 is attached to the back surface in corresponding fashion. Electrical leads 46 from the transducer pairs 41, 45 lead to associated circuits that are described hereinafter.

As best seen in FIG. 3, the width of the chain 20 along the longitudinal axis of the collar 12 is centered relative to and symmetrically spans the central portion of the threaded region of the collar 12. At this central circumference, the thickness of the collar 12 wall is approximately equal to the thickness of the pin 14 wall when the two tubular sections are properly engaged, so that despite the taper in the two threads the ratio of the wall thicknesses is approximately unity. Observation of this relationship is important to obtaining superior results, inasmuch as true bearing pressure readings are best observed in this region. When the relation between the average wall thicknesses becomes disproportionate in either sense, the strain exerted upon or the force exerted by the thinner member varies in nonlinear fashion.

Figure 11:
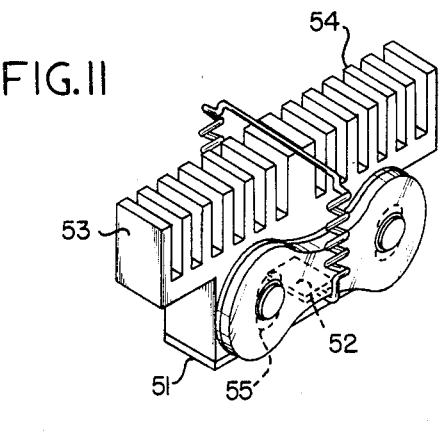
FIG. 11 is a perspective view of a collar temperature sensor mounted on a chain-type bearing pressure sensor device.
Figure 12:
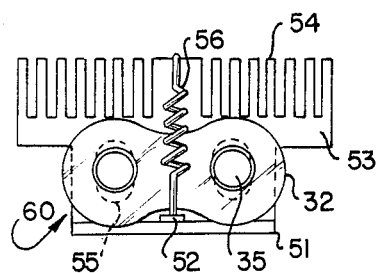
FIG. 12 is a side view of the sensor of FIG. 11.

The accuracy of the readings obtained can be profoundly influenced by the temperature levels and temperature differentials between the operative elements in the system, because temperature expansion and contraction give rise to substantial change in the circumferential dimension of these elements and can generate extremely high mechanical forces. Thus in accordance with the invention, referring now to FIGS. 11 and 12 as well as FIGS. 1–4, a collar temperature sensor 50 is mounted on the chain 20, so as to engage a curved contact pad 51 of heat conductive material, such as aluminum or magnesium, to the surface of the collar 12. The collar temperature sensor, which may be a temperature responsive strain gauge 52, is mounted on the outer surface of the contact pad 51 and in thermal energy exchange relation therewith, although it may also be mounted so as to be embedded within the contact pad 51. A heat conductive block 53 is configured to mate within the chain link 32, and to be in thermal contact relation with the contact pad 51 without interfering with the transverse pins 35 in the chain link. Heat exchange fins 54 in the block 53 aid in dissipating heat when a sensing operation has been completed. Slots 55 within the block 53 enable inward and outward movement, between limits, of the contact pad 51 relative to the collar, and springs 56 securing the block 53 to the chain link 32 mechanically urge the contact pad 51 toward the collar 12 so as to assure seating and good thermal contact. The heat conductive block 53 may, if desired, be thermally insulated from the chain link 32 and the transverse pins 35. The fins 54 provide a large surface area for heat dissipation from the contact pad when the chain 20 is removed from one collar after makeup and before it is applied to the next succeeding collar in the series. A water or air cooling flow (not shown) may be utilized to assist in this temperature stabilization as will be recognized by those skilled in the art.

Referring now to FIGS. 13 and 14, as well as FIGS. 1–4, a chain temperature sensor 60 is coupled into a different link 32 in the chain 20, and may comprise a heat conductive block 62 that is soldered, brazed or welded within the chain link, and includes apertures through which the chain pins may be received so that relative movement of the chain links is not restricted. A temperature sensitive element 63, which again may be a temperature sensitive strain gauge, is mounted in thermal exchange relationship with the block 62, so as to enable temperature readings constantly to be taken via associated electrical leads at the processing circuits.

Inasmuch as the ambient temperatures of the pipe and collar are also important, a removably attachable pipe ambient temperature sensor 65, shown in FIG. 15, is employed that may be placed on one pipe in a group awaiting makeup. Alternatively this sensor may be placed on any element having the same temperature as the pipe and collar supply, which heats up or cools off in accordance with ambient air temperature, solar radiation, wind and other effects. This sensor 65 includes a generally rectangular frame 66 having a curved heat conductive contact pad 67 for registering with the outer pipe surface. A temperature sensitive element 68 mounted on the curved pad 67 again provides, via associated electrical leads, the signal variations needed for associated circuits. Permanent magnets 69 forming a part of the frame 66 enable the pipe temperature sensor 65 to be removably attached by magnetic attraction.

Accurate and easy positioning of the chain 20 and associated system relative to the collar 12 are assured by positioning mechanism 70 (best seen in FIGS. 1-4) which includes upper circumferentially spaced apart blocks 72 of urethane or like durable material having a hardness insufficient to damage or mark the metal sections of pipe. The blocks 72 are segmented and although closely abutting provide adequate separation to assure access to the quick release pin 36 and the scissors mechanism 24. There is, however, sufficient overhang relative to the outer diameter of the collar to protect the chain and the electronic elements from damage by mechanical structures, such as a loose swinging pipe or power tong. Each block 72 includes an inside shoulder 74 (FIGS. 2 and 3) which curves so as to mate with the upper surface of the collar 12, thus providing a vertical registration plane for locating the positioning mechanism 70 and the attached chain 20 relative to the pipe threads. As seen in FIG. 3, countersunk holes 75 in the blocks 72 permit removable pins 76 in each quadrant of the chain to extend through the links in the chain 20 to lower arc-shaped blocks 78 that provide additional barriers against impact. Between the chain 20 and the upper blocks 72, spacer sleeves 79 are disposed about the removable pins 76 to determine the position of the chain relative to the inside reference shoulder 74 on the blocks 72. Spacer sleeves 79 of different sizes may be interchanged quickly if required by a change in the size or grade of pipe collar that is being used. The attachment pins 37 may be affixed to the spacer sleeves 79, as shown in FIGS. 1 and 3 respectively. Similarly, interchangeable lower spacer sleeves 80 are utilized between the chain and the lower arc blocks 78.

Although the chain 20 and associated mechanism may be manipulated manually, it is convenient and preferred to employ a counterbalanced movable arm support 86, seen only in FIG. 1. The movable arm support is attached to a mobile or fixed base 87, shown only generally, and incorporates a pair of pivotable arms 88, 89, which can be extended with two directions of movement within a plane intercepting the mid-region of the pipe string. Compensating springs 90 at the linkage points enable the weight of the structure and the attached mechanism, which is joined via the attachment pins 37 to a yoke 91, to be substantially fully counterbalanced.

Referring again to FIG. 1, the inputs from the various transducers and sensors are applied to correspondingly designated bridge circuits, namely a pipe temperature compensation bridge 100, a collar temperature compensation bridge 102, a chain temperature compensation bridge 104 and a strain gauge bridge 106. The specific circuits for a practical example are depicted in greater detail in FIG. 8, but the compensation derives from the interrelationship between the different bridge circuits, which each contribute additively or subtractively to the output of the strain transducer bridge 106. Conventional strain gauge instrumentation circuits 108, comprising preamplifiers, zero setting and calibration circuits (if desired), are coupled to receive the output from the strain gauge bridge 106, and provide actuating signals to a recorder 110 and a display 112. Because the mechanism is intended and suitable for continuous use in the makeup of sections of pipe or casing, the recorder 110 provides a continuous record for future reference if problems should develop in the string. The display 112 enables the operating crew to determine when the final makeup bearing pressure is within a correct range.

In the operation of the system of FIGS. 1-4, when the lower pipe section 13 and the affixed collar 12 have been lowered after the prior makeup operation to the proper height for attachment of the next pipe section, the bearing pressure sensor 10 can be placed in position. This can be done without difficulty while the next upper pipe section 14 is moved to makeup position. The chain 20 is carried on the yoke 91 on the movable arm support 86 with the quick release pin 36 removed, so that the counterbalanced arm support can be used to move the chain into such position that it may be wrapped around the collar 13. In the mounting position the inside reference shoulder 74 on the positioning mechanism seats against the upper end of the collar 13 with a relatively loose fit, and the quick release pin 36 may easily be inserted at this time. Thus, the chain 20 is positioned so that the center line of the deformable element 22, and the strain gauge assembly 40 are precisely in the desired sensing plane relative to the middle of the threaded length of the collar 13. Some variation in this sensing plane relative to the mid-region of the collar thread is permissible, as long as the position is held uniform for successive sections of pipe and the proper calculations are utilized. Basically, this position is the nominal location of the hand tight plane for that grade and weight of pipe.

Prior to makeup operation, the adjustment screw 29 is tightened manually until the instruments indicate a predetermined preload setting. It is convenient to use a basic unit of deformation or extension called a "microstrain", with one microstrain being equal to a deformation of $1 \times 10^{-6}$ inches. A deformation of this extent can be detected by the strain gauge assembly 40 that is used; and the employment of such reference units enables operating crews to adapt to the system without delay. For example, it is found that an initial preload tension of approximately 200 microstrain is suitable for seating the point contacts on the chain 20 firmly against the pipe collar 13, so that the output signal variation thereafter is substantially linear as bearing pressure is increased. Uniformity of operation is further assured by presetting each bearing pressure sensor to a given common reference, so that sensors can be changed in the field without requiring recalibration or new settings. The operating crew then knows, from precomputed values, the bearing pressure reading that must be reached for each grade and weight of pipe that is to be used in the drill string.

When the bearing pressure sensor has properly been preset, the makeup operation can commence by engaging the upper pipe section 14 with the power tongs 16. The upper arc blocks 72 on the positioning mechanism 70 function as a guide and stabber for the free end of the pipe section that is to be received within the collar 12. With the pin 14 engaged in the collar 12, and driven by the power tongs 16, bearing pressure exerted by the pin 14 begins an increasing hoop deformation of the collar 12 in the region that is encircled by the chain 20. The fact that the chain 20 spans a length along the longitudinal axis of the collar 12 results in some differential deformation, because the wedging action of the male threads on the pin 14 tends to distort the collar 12 more adjacent its narrow walled end than at its thicker wall regions. However, the bearing pressure sensor 10 effectively integrates or averages this variation by transfer-ring a net tensile force to the ends of the deformable element 22. With a chain of high tensile strength and high Young's modulus in comparison to the stiffness of the relatively softer deformable element 22, the total hoop deformation of the collar 12 in and about the sensing plane is converted into an extension of the short deformable element 22, which deformation is sensed by the strain gauge assembly 40. The degree of extension, however, is well within the recoverable elasticity range of the deformable element, so that a great many readings can be taken under normal operation without displacing the base line of the readings that are given by the strain gauge assembly 40. This fact is of great importance in field operations, because while interchangeability is desirable it is preferable to avoid carrying a substantial amount of equipment, or replacing or readjusting elements in the field. The deformable element 22 also provides the important function of providing mechanical gain because the arrangement concentrates all of the hoop deformation of the collar into a relatively short span. The use of two pairs of orthogonally disposed strain gauges provides complementary tension and compression readings that can be used directly in the strain gauge bridge 106, as described below, and therefore further enhance the reliability and sensitivity of the system. The net result is a reading of the actual bearing pressure within the region of greatest interest in the threaded portion of the collar, namely the mid-region in which secure mechanical connection and a leak free seal can be assured. The presence of foreign matter, damaged threads or mismatched tolerances does not affect this reading, which is directly representative of the bearing pressure.

As noted, however, temperature differentials can introduce a significant variation in the bearing pressure output reading. Further, these temperature differentials can vary widely during the makeup process, which can generate and transfer significant amounts of frictional heat. Thus, the readings from the strain gauge bridge circuit 106 are modified in a number of different ways by coupling the bridges 100, 102, 104, 106 together in parallel in certain senses. Coupled in this fashion, the signals from the bridges 100, 102 and 104 add to or subtract from the output of the strain transducer bridge 106. The collar temperature compensation bridge 102 subtracts microstrain as the collar temperature increases. Microstrain is added in proportion to increasing chain temperature. Combining these readings in opposite senses gives a differential between collar and chain temperatures, which varies with time as the collar temperature rises due to frictional effects and the chain temperature thereafter increases with some lag due to the inefficiency of heat transfer between collar and chain. The third compensatory factor relates to the ambient pipe (and collar) temperature. This reading is added to the output readings to compensate for the fact that solar heating and perhaps other factors can substantially expand the pipes and collars (relative to the chain) while they are in storage. The ambient pipe temperature effectively provides a reference against which chain and collar variations can be measured. Consequently, the system fully compensates for all significant variables.

In practical systems in accordance with the invention, for typical grades and weights of pipe, the desired ultimate reading is in the range of 1500 to 2500 microstrain. The theoretical figure for any threaded tubular joint is readily calculated from known literature, because this subject has been examined at length. Properly compensated systems in accordance with the invention permit precise pipe makeup operations to be carried out with no significant delay due to the attachment, use and disengagement of the bearing pressure sensor. The graph of FIG. 5 shows that the bearing pressure readings are substantially linear throughout the entire range of interest. Once the preloading level has been set (about 200 microstrain in this practical example) with the pipe coupling threaded to the hand tight plane, the readings are sometimes initially nonlinear but thereafter become essentially linear at a slope dependent upon the characteristics of the particular pin and box. For example, curve B in FIG. 5 represents a condition in which the pin and box have nominal thicknesses and thread tapers. Curve A represents a condition in which the pin taper converges less sharply than the box taper, so that as makeup proceeds the readings go initially higher but thereafter increase at a lesser rate. Conversely, curve C illustrates the situation in which the pin taper is sharper than the box taper, so that the rate of increase of microstrain is higher. In contrast to these conditions, all of which provide an acceptable coupling because the final bearing pressure is proper, curve D illustrates a condition in which the desired final reading is not reached with a proper depth of penetration. Consequently, with properly calibrated equipment, proper mechanical joinder and leak free seals can be assured throughout an entire string of pipe or casing.

As mentioned, under certain circumstances, such as out of tolerance pipe or threading, the joinder may simply not be acceptable. Basically, if the microstrain reading is either reached too early or is not approached when the last scratch mark is too far in, the coupling is not satisfactory. The presence of the last scratch mark aids in making the determination by providing a positional reference. For convenience, in practicing the method of the present invention a visible marker is placed at the last scratch line as an aid to the operator, this marker having a width extending to one-quarter inch on each side. The operator can easily observe if the pin does not penetrate into the collar sufficiently far, or remains too far outside when the appropriate bearing pressure has been achieved. An informed judgment can be made immediately as to whether the pipe section is to be used or whether it should be replaced. With experience, the nature of the bearing pressure variations during makeup, can be interpreted in determining whether the joinder is satisfactory. These variations can be recorded digitally or on a chart recorder for future reference.

When the desired final reading has been obtained and the appropriate position of the last scratch has been visually verified, the bearing pressure sensor can be removed simply by detachment of the quick release pin 36, opening the chain 20 for disengagement from the collar 12. Usually the chain 20 is loosened slightly to permit this disengagement to take place more readily. The counterbalanced arm support 86 can then be moved to shift the bearing pressure sensor 10 out of the way so that the string can be lowered and a new pipe section can be added.

The accuracy and repeatability of this system has been demonstrated in a number of ways, the foremost of which is tests under practical field conditions. The microstrain at the point of initialization, after pretensioning, is independent of temperature values because it is not intended to reflect bearing pressure but only the tension of the sensor chain on the collar. In all instances, when the nominal bearing pressure selected for the given size, weight and grade of pipe is reached, the operator knows that in the significant bearing region, (the approximate mid-region of the threaded portion of the collar), attainment of the desired bearing pressure represents a secure and leak free coupling. Because the readings are compensated for temperature differentials, involving both static and dynamic temperature changes that occur during makeup, the bearing pressure reading is extremely accurate. Moreover, factors which affect the required torque, such as damaged pipe threads and foreign matter, or pipe and collar eccentricities, do not significantly alter the bearing pressure reading. The output reading is an integrated value representative of the totality of collar deformation in the significant region, rather than the effects of spot deformation or distortions of limited area. Weaknesses in a part of the wall of the collar have little effect on this integrated output value.

Figure 8:
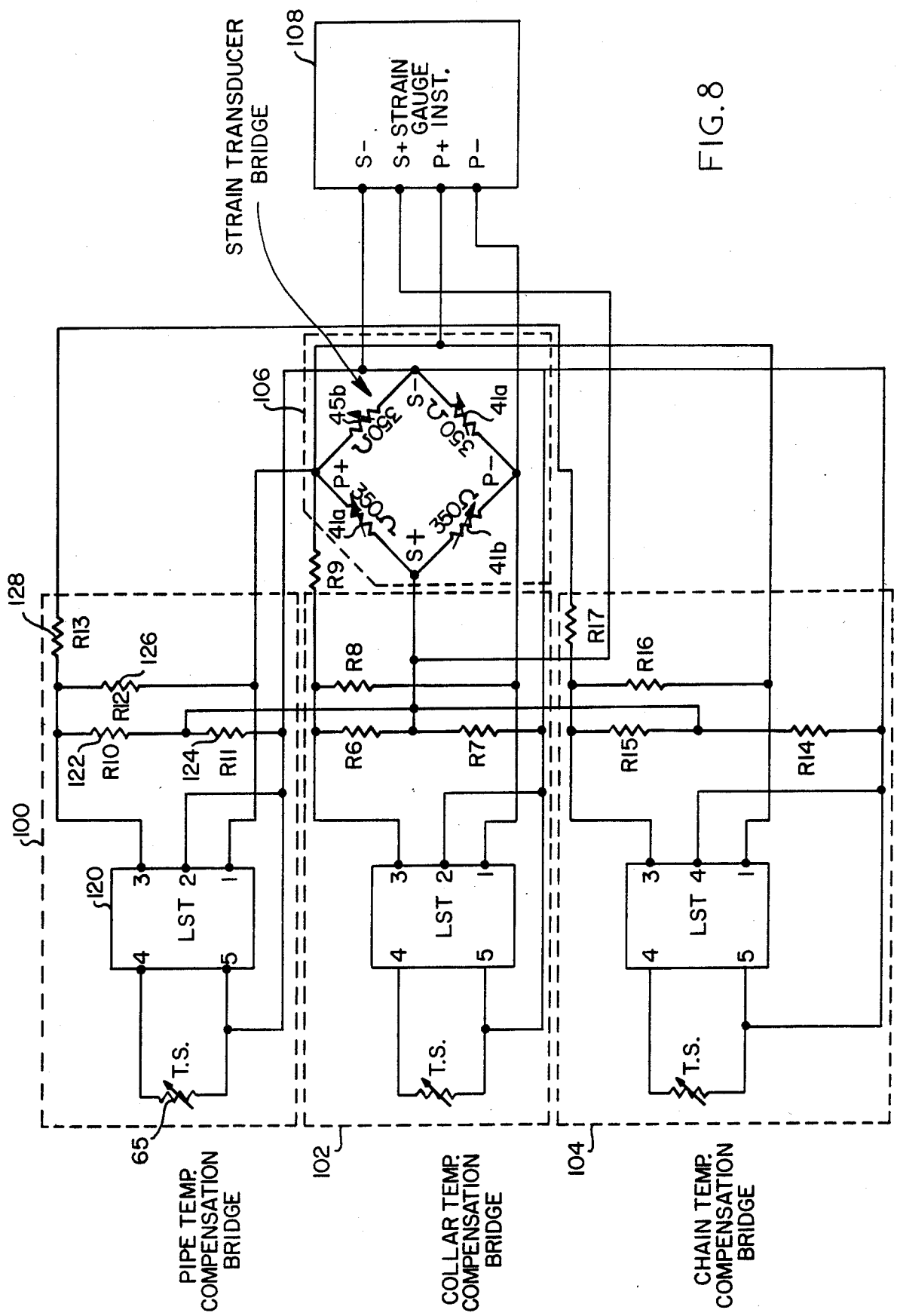
FIG. 8 is a schematic diagram of electrical circuits employed in the system of FIGS. 1-4.

A specific example of strain measuring and temperature compensating circuits is shown in the example of FIG. 8, in which elements and circuits corresponding to those previously described are similarly numbered. The two orthogonal transducer pairs 41 and 45 (FIG. 6) are here shown as individual elements 41a, 41b, 45a and 45b each having a nominal 350 ohm value coupled together in a bridge connection with opposed nodes P+ and P− and with output terminals taken from the mid-points S+ and S−. The two elements 41a and 41b forming the first orthogonal transducer pair are coupled together in series and joined at the junction S+, with the transducer (here arbitrarily designated 41a) that represents the tension variation in the deformable element 22 (FIG. 1) being in one arm. The associated transducer 41b responsive to the compression variation is in the other arm of the bridge. Thus the resistance value of one increases as the other decreases, causing an imbalance that is reflected in the output voltage variation at the S+ junction. The strain gauge elements 45a and 45b comprising the second orthogonal transducer pair are coupled together in like fashion, being joined at the opposite junction S−. They are however disposed in inverse relationship, such that the voltage swing at the S− junction is opposite to that at the S+ junction, as seen at the strain gauge instrumentation 108. The strain gauge bridge 106 can be used alone under conditions in which temperature differentials are of no great significance, such as in a controlled environment where all the operative elements are essentially at the same temperature and makeup is sufficiently slow as not to introduce significant frictional heating.

In practice under field conditions, however, the pipe ambient temperature compensation bridge 100, the collar temperature compensation bridge 102 and the chain temperature compensation bridge 104 are arranged to provide the needed linearity and sensitivity in the overall system under field conditions. Inasmuch as each is essentially the same, only the pipe temperature compensation bridge 100 is described in detail, it being recognized that the active elements in the different bridges comprise the pipe ambient temperature sensor 65, the collar temperature sensor 50 and the chain temperature sensor 60 respectively, each of which is depicted as a variable resistor. In the bridge 100, the temperature sensor 65 is coupled to an LST matching network 120 which is adjustable to match the nominal characteristics (again 350 ohms in this example) of the temperature sensor 65, and which consequently forms an adjacent arm within the bridge circuit 100. Fixed bridge resistors 122 and 124, also having nominal 350 ohm values are coupled to opposite terminals of the LST matching network 120, to complete the bridge, so that only the pipe ambient temperature sensor 65 represents a variable element in the bridge. The bridge further includes first and second trimming resistors 126, 128, arranged to modify the response of the bridge 100 in terms of microstrain output per degree temperature variation. The first trimming resistor 126 is coupled to shunt the output coupling between the bridge 100 and the P+ and P− terminals of the strain gauge bridge 106. The second trimming resistor 128 is disposed in series with the coupling to the P− terminal, so that the two trimming resistors determine both slope of the output signal change in response to temperature variations.

The signal output variations from the pipe temperature compensating bridge are adjusted and coupled to add 6.33 microstrain for each degree Fahrenheit increase in the pipe temperature. This input is summed with the strain transducer bridge 106 output and may be regarded as providing a variable reference for the other temperatures that are sensed. The collar temperature reading from the compensation bridge 102 is combined in the opposite sense, so that increases in collar temperature result in a decrease of 6.33 microstrain for each degree Fahrenheit. Initially the collar is safely assumed to be at ambient pipe temperature, but increases due to frictional heating during pipe makeup can introduce an error as high as 30% in the final reading, because the chain temperature remains lower and there is no comparable thermal expansion. In effect the readings from the collar temperature compensation bridge 102 (used subtractively) and the chain temperature compensation bridge 104 (used additively) give a differential value for the relationship between collar and chain temperatures. This differential changes with time in different ways as makeup proceeds, because as collar temperature rises heat is conducted to the chain, which itself begins to expand. An expansion of the collar in response to a high collar temperature and a relatively lower chain temperature results in a temporary deformation and artificially high reading. In effect the reading from both compensating bridges 100 and 102 is compared to the output reading from the chain temperature compensating bridge, but in opposite senses as previously described. If the temperatures of the pipe, collar and chain are the same, whether above or below some normal ambient, no compensation need be or is introduced. However, when differential temperatures exist, either on a static or a dynamic basis as the makeup operation proceeds, this system accurately compensates.

Calculation of the nominal microstrain is determined by first calculating bearing pressure and then calculating the hoop stress on the collar outer diameter. Calculation of the nominal bearing pressure needed for a given collar and pin can be effected readily by employing well known mathematical analyses. The registering collar and pin have known wall thickness, thread tapers, and the thread pitch. Thus as the pin is threaded into the collar the opposing surfaces function as mating wedges, with the inner wedge (the pin) exerting constantly increasing force on the outer wedge (the collar). The bearing pressure increase as the pin is turned past the point of initial solid contact ("hand tight plane" or "HTP") can be set out as follows:

$$p = \frac{E\delta}{b}\left[\frac{(c^2 - b^2)(b^2 - a^2)}{2b^2(c^2 - a^2)}\right]$$

Also, $\sigma_t$ equals the tangential (hoop) stress on the collar outer diameter, which may be expressed as:

$$\sigma_t = \frac{b^2 p}{c^2 - b^2}\left(1 + \frac{c^2}{r^2}\right)$$

$$= \frac{2b^2 p}{(c^2 - b^2)},$$

because $r^2 = c^2$ at the collar outer diameter.

Because strain ($\epsilon$) can be converted to microstrain since $$\epsilon = \frac{\sigma_t}{E} \text{ and } \mu\epsilon = \frac{\sigma_t \times 10^6}{E},$$

values of nominal microstrain desired for a given size and grade of tubular goods can be calculated. The modulus of elasticity, for example, is typically $30 \times 10^6$ and the other constants are known from the established standards. Workers in the art have also studied bearing pressures using other analytical approaches, and these may also be used.

The analog circuits described herein provide one advantageous example of electronic techniques that may be employed. It will also be appreciated that the various readings taken may be converted to digital form and that the necessary calculations can be made by a general purpose or special purpose digital processor.

Figure 9:
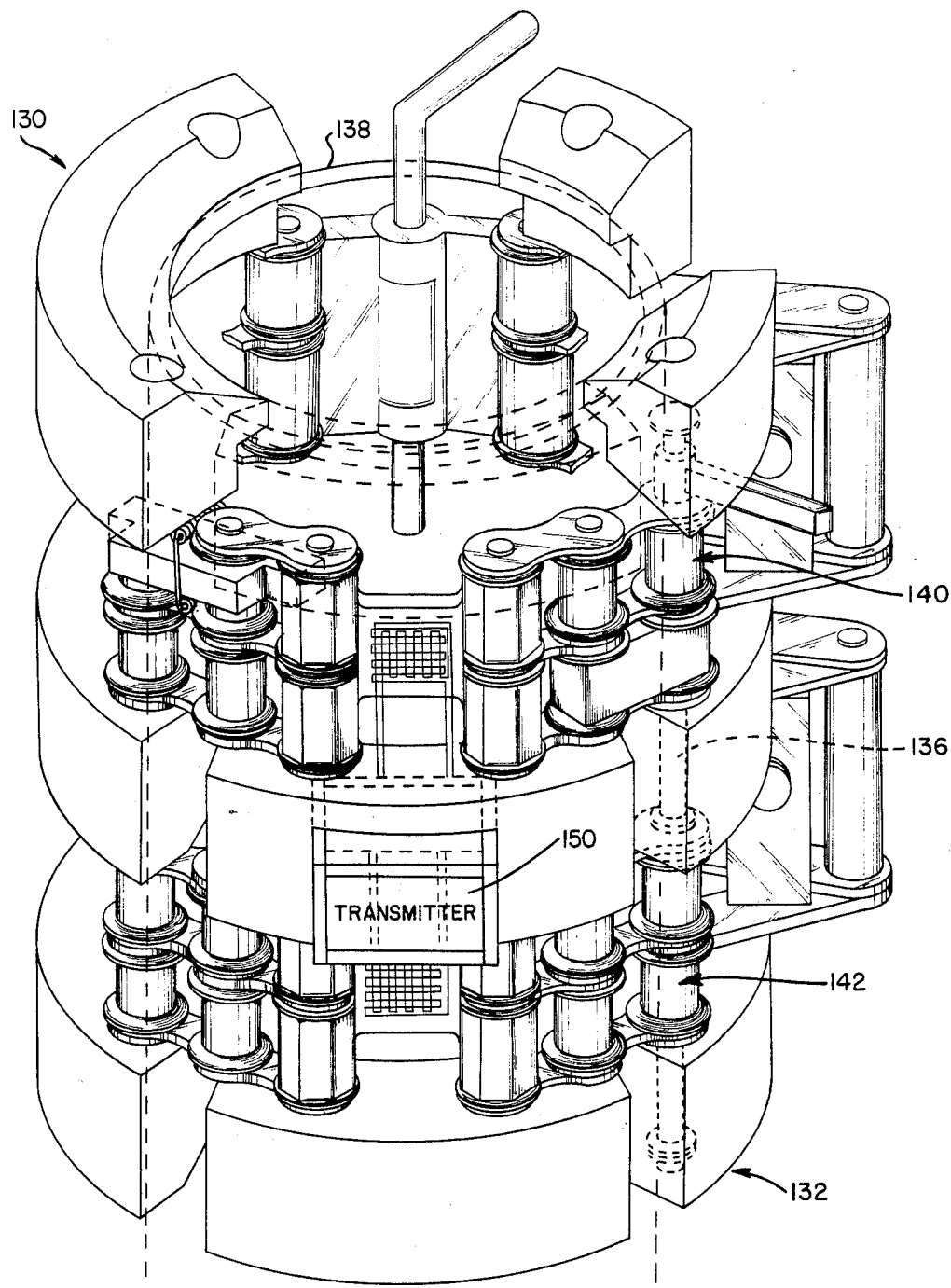
FIG. 9 is a perspective view, partially broken away, of a bearing pressure sensor arrangement in accordance with the invention for use in a floating collar application.
Figure 10:
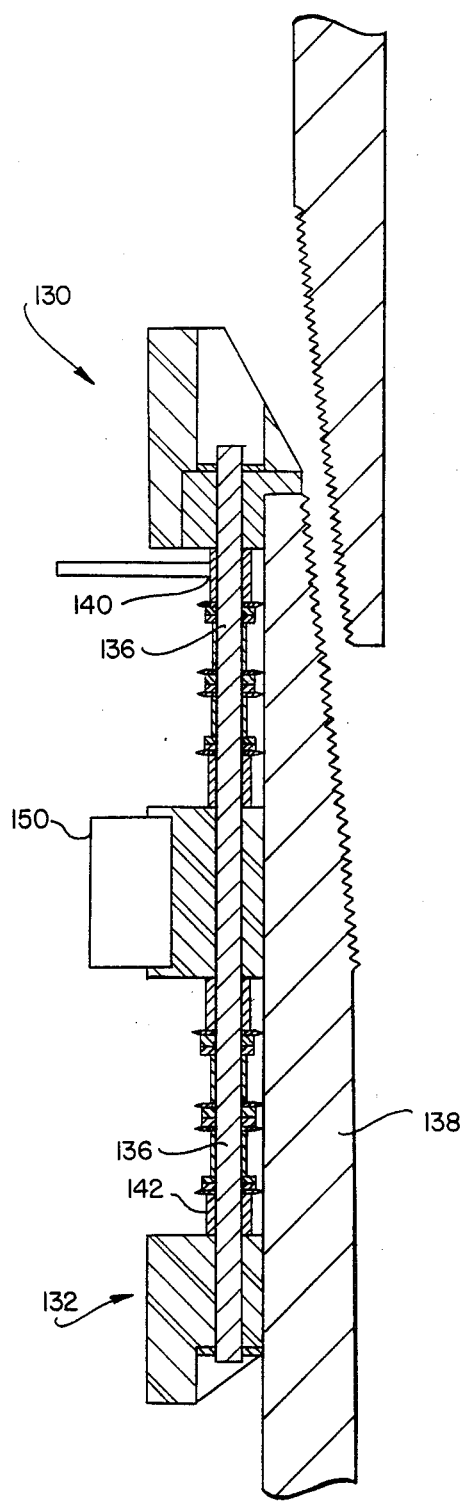
FIG. 10 is a side sectional view of the arrangement of FIG. 9.

For the coupling of successive sections of tubular product with concurrent tightening of threaded connections at both ends of a floating collar, the sensor structure may utilize an additional bearing pressure sensor and derive signals while rotating the sensor structure with the collar. As seen in FIGS. 9 and 10 an attachable sensor system comprises both top and bottom guard rings 130, 132 respectively, each having a diverging interior conical surface for buffering and guiding the adjacent pipe section end into position relative to the corresponding end of the collar. As described in conjunction with the prior example, the end guard rings 130, 132 may be of durable plastic material to prevent pipe and thread damage, and the upper guard ring 130 includes an inner shoulder for engaging and seating against the collar and concentrically as a position reference. Coupling pins 136 extend between the end guard rings 130, 132 to maintain them together in an adjustable relationship which mates to the floating collar 138. The pins 136 also provide mounts for a pair of belts 140, 142, each disposed in the mid region of a different threaded portion of the collar 138. The system also includes a centrally disposed plastic band to which electrical connectors 144 are coupled from the different sensor belts 140, 142. The central plastic band 144 is also advantageously of the same material as the end guard rings 130, 132, for secure joinder to the collar 138 and protection of the electrical elements in the system. A small self-powered transmitter 150 having limited range is mounted on the central band 144 and electrically coupled to the strain gauges (not shown in detail) on the sensor belts 140, 142. The transmitter 150 may include means for time sharing or frequency sharing of the signals from the two sensors, but separate transmitters operating in different frequency bands may also be used. To transmit the signal variations from the sensor belts 140, 142 it is preferred to employ frequency modulation, but amplitude modulation or any other conventional system, including digital encoding, may be used inasmuch as miniaturized circuits need not be restricted to a small region on the structure.

Alternatively, the central band 144 may incorporate preamplifiers, and associated batteries, to amplify the strain gauge output sufficiently to transfer the signals via slip rings concentric with the collar 138 to brushes that are in circuit with the associated instrumentation. This is a reliable system where operating conditions permit its use. With the transmitter 150 shown, the system also employs a receiver 152, including a demodulator (not shown in detail) coupled to the associated instrumentation.

The system of FIGS. 9 and 10 can be attached separately to the floating collar 138 before it is placed in position and started on the pipe. Precise concentricity and exact longitudinal placement of the sensor belts 140, 142 are assured by spacer sleeves 154 interposed between each end guard ring 130, 132 and associated sensor belts 140, 142, and in turn between the sensor belts and the central band 144. Where the floating collars for a drill string are invariant in length the spacer sleeves 154 can be a fixed length. Where adjustment is desired or needed, dual sliding sleeve spacers with set screws (not shown) can alternatively be employed, or spacers of a different length can simply be substituted.

In the operation of the system of FIGS. 9 and 10, the self contained bearing pressure sensor system is placed onto the collar 138 before or at the time it is ready for tightening on the lower mating pipe section. The upper mating pipe section is then entered into place, and gripped by the power tongs for the makeup operation. Rotation of the upper pipe section rotates the floating collar as well, the lower pipe section being held, until both bearing pressures are in the predetermined range. If there is a significant torque variation required, because of thread damage or foreign matter, in reaching the desired bearing pressure levels, this will immediately be determinable and one of the elements may have to be rejected or an adjustment may have to be made to bring the bearing pressure into the desired nominal value.

Although a number of forms and variations have been described above, it should be understood that the invention is not limited thereto but encompasses all modifications and expedients falling within the scope of the appended claims.

What is claimed is:

1. A mechanism for sensing the necessary and sufficient engagement of one threaded cylindrical member within another comprising encircling means including a high tensile strength section having a predetermined high resistance to elongation disposed about the outer periphery of the outer cylindrical member for sensing the outward deformation thereof in the threaded region in response to threading of the inner cylindrical member, said encircling means including a short span longitudinally deformable member operable within its elastic limits and having a smaller cross section and a lower resistance to elongation than the high tensile strength section, such that outward deformation of the cylindrical member provides a corresponding total extension of the deformable member within its yield limits and comprising chain link means for conforming to the periphery of the outer cylindrical member, said chain link means having only a plurality of point contact surfaces in contact with said outer cylindrical member, and including separable means for readily attaching and detaching the encircling means relative to the outer cylindrical member, and means for adjustably controlling the initial tension of the encircling means about said cylindrical member, said encircling means being disposed symmetrical with a central plane that intersects with and is normal to the cylindrical member at a mid-region of the threaded portion thereof, the encircling means spanning a longitudinal band of the cylindrical member and the central plane being disposed such that the ratio of the average wall thicknes of the inner and outer cylindrical members is substantially unity in the region directly opposite the encircling means, and means comprising strain sensing means disposed in substantially symmetrical relation to said plane and coupled to said deformable member for sensing the elongation in said deformable member.

2. A mechanism for sensing the necessary and sufficient engagement of one threaded cylindrical member within another comprising encircling means disposed about the outer periphery of the outer cylindrical member for sensing the outward deformation thereof in the threaded region in response to threading of the inner cylindrical member, said encircling means comprising a high tensile strength section having a predetermined high resistance to elongation, said encircling means including a short span longitudinally deformable member operable within its elastic limits, the deformable member having a smaller cross section and a lower resistance to elongation than the high tensile strength sections, such that outward deformation of the cylindrical member provides a corresponding total extension of the deformable member within its yield limits, and means coupled to said deformable member for sensing the elongation in said deformable member comprising a pair of orthogonally disposed strain gauges mounted on each opposite side of the smaller cross section portion of the deformable member for sensing longitudinal extension and transverse compression respectively.

3. A mechanism for sensing the necessary and sufficient engagement of one threaded cylindrical member wtihin another comprising encircling means disposed about the outer periphery of the outer cylindrical member for sensing the outward deformation thereof in the threaded region in response to threading of the inner cylindrical member, said encircling means including a short span longitudinally deformable member operable within its elastic limits and further including positioner means having reference shoulder means engageable with the end of said outer cylindrical member coupled to and positioning said encircling means in a selected position relative to the threaded region thereof, and means coupled to said deformable member for sensing the elongation in said deformable member.

4. The invention as set forth in claim 3 above, wherein said positioner means includes diverging guide collar means engaging and extending from the end of the cylindrical member for receiving and guiding the threaded member to be received, the guide collar means comprising a number of resilient arcuate segments outwardly radially extending beyond the encircling means to protect the deformable member and the means for sensing elongation.

5. The invention as set forth in claim 4 above, further including a second number of resilient arcuate segments coupled to the encircling means on the opposite side thereof, the coupling including removable transverse pins and replaceable spacer sleeves thereabout between at least the first number of arcuate segments and the encircling means.

6. A mechanism for sensing the necessary and sufficient engagement of one threaded cylindrical member within another comprising encircling means disposed about the outer periphery of the outer cylindrical member for sensing the outward deformation thereof in the threaded region in response to threading of the inner cylindrical member, said encircling means including a short span longitudinally deformable member operable within its elastic limits, the mechanism further including means coupled to sense the temperatures of at least the outer cylindrical member and the encircling means, means coupled to derive an output signal from the means for sensing the elongation, and means responsive to the output signal and the sensed temperatures for providing a corrected output signal means coupled to said deformable member for sensing the elongation in said deformable member.

7. The invention as set forth in claim 6 above, further including means for sensing the ambient temperature of the threaded member, and wherein said means for providing a corrected output signal is also responsive to the sensed ambient temperature of the threaded member.

8. The invention as set forth in claim 7 above, wherein the means for deriving an output signal comprises a first bridge circuit, wherein said means for sensing the temperatures of the outer cylindrical member, the encircling means and the ambient threaded member temperature comprise first, second and third temperature responsive elements in contact with the outer cylindrical member, encircling means and threaded member respectively, and second, third and fourth bridge circuits respectively coupled and responsive to the first, second and third temperature responsive elements, the outputs of the second and fourth bridge circuits being additively combined with the output from the first bridge circuit and the output of the third bridge circuit being subtractively combined with the output from the first bridge circuit.

9. A system for ascertaining the proper joinder of a pair of mating threaded tubular members comprising:
an elongated member disposed about the circumference of the outer tubular member in a position at least partially coextensive with the threaded portion thereof, the member having relatively low longitudinal deformability in response to circumferential expansion of the outer tubular members, the elongated member transverse dimension spanning a longitudinal segment of the outer tubular member that is contained within the longitudinal limits of the threaded portion thereof, the elongated member including a sensor section of relatively higher longitudinal deformability and a relatively narrower transverse dimension, the member mating with the outer tubular member with a tight fit whereby circumferential deformation of the outer tubular member causes a mechanical gain effect in the deformation of the sensor section; and
strain sensing means mounted on the sensor section of the elongated member for providing indications of the bearing pressure variations as the tubular members are threaded together.

10. A system for ascertaining the proper joinder of a pair of mating threaded tubular members comprising:

an elongated member disposed about the circumference of the outer tubular member in a position at least partially coextensive with the threaded portion thereof, the member having relatively low longitudinal deformability in response to circumferential expansion of the outer tubular member and including a sensor section of relatively higher longitudinal deformability, the member mating with the outer tubular member with a tight fit and the elongated member including means in facing relation to the outer surface of the tubular member providing essentially point contacts therewith, whereby the effects of foreign matter on the tubular member are minimized; and strain sensing means mounted on the sensor section of the elongated member for providing indications of the bearing pressure variations as the tubular members are threaded together.

11. A system for ascertaining the proper joinder of a pair of mating threaded tubular members comprising:

an elongated member disposed about the circumference of the outer tubular member in a position at least partially coextensive with the threaded portion thereof, the elongated member comprising a chain of link members, whereby the member conforms to the outer circumference of the tubular member despite eccentricity therein, and wherein the chain includes hardened washers having sharpened edges providing a number of solely point contacts with the tubular member, the member having relatively low longitudinal deformability in response to circumferential expansion of the outer tubular member and including a sensor section of relatively higher longitudinal deformability, the member mating with the outer tubular member with a tight fit; and strain sensing means mounted on the sensor section of the elongated member for providing indications of the bearing pressure variations as the tubular members are threaded together.

12. A system as set forth in claim 11 above, wherein the elongated member comprises a double row chain of high composite elasticity modulus and the sensor section comprises a central narrow portion of smaller cross-sectional area and substantially lower elasticity modulus, the strain sensing means including strain sensing elements mounted on opposite sides of the sensor section.

13. A system as set forth in claim 12 above, wherein the strain sensing means comprises two pairs of orthogonally disposed strain gauges, one pair on each side of the sensor section, and one strain gauge of each pair being mounted to sense deformation in a direction parallel to the longitudinal axis of the elongated member, and the other being mounted to sense deformation in a direction orthogonal thereto.

14. A system for ascertaining the proper joinder of a pair of mating threaded tubular members comprising:

an elongated member disposed about the circumference of the outer tubular member in a position at least partially coextensive with the threaded portion thereof, the member having relatively low longitudinal deformability in response to circumferential expansion of the outer tubular member and including a sensor section of relatively higher longitudinal deformability, the member mating with the other tubular member with a tight fit;

strain sensing means mounted on the sensor section of the elongated member for providing indications of the bearing pressure variations as the tubular members are threaded together; and positioning means coupled to said member and engaging a reference surface on the outer tubular member to locate the elongated member in the desired longitudinal position relative to the threaded portion thereof.

15. A system as set forth in claim 14 above, wherein said positioning means comprises end block means having interior shoulder surfaces for engaging the annular end of the outer tubular member, and spacer bars coupling the elongated member to the end block means.

16. A system as set forth in claim 15 above, wherein said spacer bars include replaceable sleeve means for establishing a precise spacing between the end block means and the elongated member.

17. A system as set forth in claim 15 above, wherein the end block means includes diverging interior surfaces for providing guiding of an inner tubular member as it is inserted in the outer tubular member.

18. A system for ascertaining when a collar member threaded at each end is securely joined at each end to different pipe sections received therein comprising:

a pair of bearing pressure sensor means, each circumferentially disposed about the exterior of the collar member in opposition to the threaded section adjacent a different end therein, said sensor means being coupled to rotate with the collar member;

signal generating means coupled to said sensor means for generating signals representative of bearing pressure variation in each threaded joinder as the collar member is rotated during joinder; and positioning means having a reference surface engageable to an end of the collar member and coupled to the sensor means for positioning the same in desired spatial relationship to the threaded sections of the collar member, the positioning means also being coupled to rotate with the collar member.

19. A system for measuring the bearing pressure exerted on a collar by a pipe as the elements are threaded together, comprising:

a multi-link chain member seated about the outer circumference of the collar in the mid-region of the internal thread on the collar, the chain member having a substantially non-extensible major portion engaging the collar only with small area contact surfaces, and further including elastically deformable means coupling the ends of the major portion;

means coupled to the deformable means for sensing the elongation thereof;

temperature sensing means mounted on the chain member and engaging the collar to sense the temperature thereof; and means for compensating the sensed elongation with the sensed collar temperature.

20. A system as set forth in claim 19 above, further including means coupled to the chain member for sensing the chain member temperature, means for sensing the ambient pipe temperature, and means responsive to the collar temperature, chain member temperature and ambient pipe temperature for compensating the sensed elongation.

21. A system for measuring the bearing pressure existing during threading between a female threaded pipe collar and a male threaded pipe, comprising:

a carrier member circumferentially affixed to the exterior of the pipe collar and engaging the surface only at multiple small area contact points wherein the transverse dimension of the carrier member spans a longitudinal segment of the collar member in a mid-region of the threaded portion thereof, such that circumferential strains exerted on the pipe collar in the threaded portion as the pipe is threaded into the collar introduce longitudinal strain in the carrier member;

a sensor section coupled into the carrier member and yieldable relative to the carrier member to absorb by elongation substantially all of the circumferential deformation caused by the pipe collar, the sensor section having a shorter dimension than the carrier member in the direction transverse to the carrier member such that variations in deformation about the collar are averaged; and strain sensing means mounted on the sensor section.

22. A system for measuring the bearing pressure existing during threading between a female threaded pipe collar and a male threaded pipe, comprising:

a carrier member circumferentially affixed to the exterior of the pipe collar and engaging the surface only at multiple small area contact points, such the circumferential strains exerted on the pipe collar as the pipe is threaded into the collar introduce longitudinal strain in the carrier member;

a sensor section coupled into the carrier member and yieldable relative to the carrier member to absorb by elongation substantially all of the circumferential deformation caused by the pipe collar;

strain sensing means mounted on the sensor section;

means coupled to the strain sensing means for providing signal variations representing bearing pressure; and means coupled to the means for providing signal variations for compensating the signal variations in response to the temperatures of the carrier member, pipe and collar.

23. A system for measuring the bearing pressure existing during threading between a female threaded pipe collar and a male threaded pipe, comprising:

a carrier member circumferentially affixed to the exterior of the pipe collar and engaging the surface only at multiple small area contact points wherein the transverse dimension of the carrier member spans a longitudinal segment of the collar member in a mid-region of the threaded portion thereof, such that circumferential strains exerted on the pipe collar in the threaded portion as the pipe is threaded into the collar introduce longitudinal strain in the carrier member;

a sensor section coupled into the carrier member and yieldable relative to the carrier member to absorb by elongation substantially all of the circumferential deformation caused by the pipe collar;

strain sensing means mounted on the sensor section; and means coupled to the carrier member for engaging the free end of the collar and positioning the carrier member in a given intersecting plane relative to the threaded portion of the collar.

24. The invention as set forth in claim 23 above, wherein the means for engaging the collar includes means for guiding the pipe for insertion into the collar.

25. The method of positively ascertaining that a pipe is threaded into a collar with a secure joinder within a predetermined tightness range despite variations in tolerances and operative conditions comprising the steps of:

measuring the average differential change in the total circumferential deformation about the collar throughout a band of predetermined transverse dimension within the longitudinal span of the threaded portion of the collar;

concentrating the total deformation in a limited span to be measured;

establishing an initial load value and a nominal final value;

compensating the measurement for temperature variations in the pipe and collar; and comparing the compensated measurement to a precalculated optimal value of bearing pressure for the weight and grade of pipe.

26. The method of measuring the bearing pressure on a collar as a pipe is threaded into it comprising the steps of:

encircling the circumference of the collar at the threaded portion with a member having a substantially nonelongated major portion and an elastically deformable minor portion;

sensing the elongation of the minor portion to provide an electrical value;

sensing the temperature of the pipe;

sensing the temperature of the collar;

sensing the temperature of the member; and modifying the electrical value with the pipe temperature, collar temperature and differential between the collar and member temperatures to provide an output value that represents bearing pressure.

27. The method as set forth in claim 26 above, wherein the member encircles the threaded portion of the collar in a mid-region thereof and its transverse dimension spans a length along the collar axis sufficient to average collar deformation over a substantial increment of length.

28. The method as set forth in claim 27 above, including in addition the step of initializing the tension on the encircling member.

29. The method of measuring true bearing pressure of a collar as it is threaded onto a pipe comprising the steps of:

concentrating circumferential deformation of the collar into a short segment of a member encircling the collar in the threaded region receiving the pipe;

converting the deformation of the segment into an electrical signal; and compensating the electrical signal for the temperature of the collar generated during threading.

30. The method as set forth in claim 29 above, including in addition the step of compensating the electrical signal for the temperature differential between the collar and the segment.

31. The method as set forth in claim 30 above, including in addition the step of further compensating the electrical signal for the initial temperature of the pipe.

* * * * *